Figure 1B:
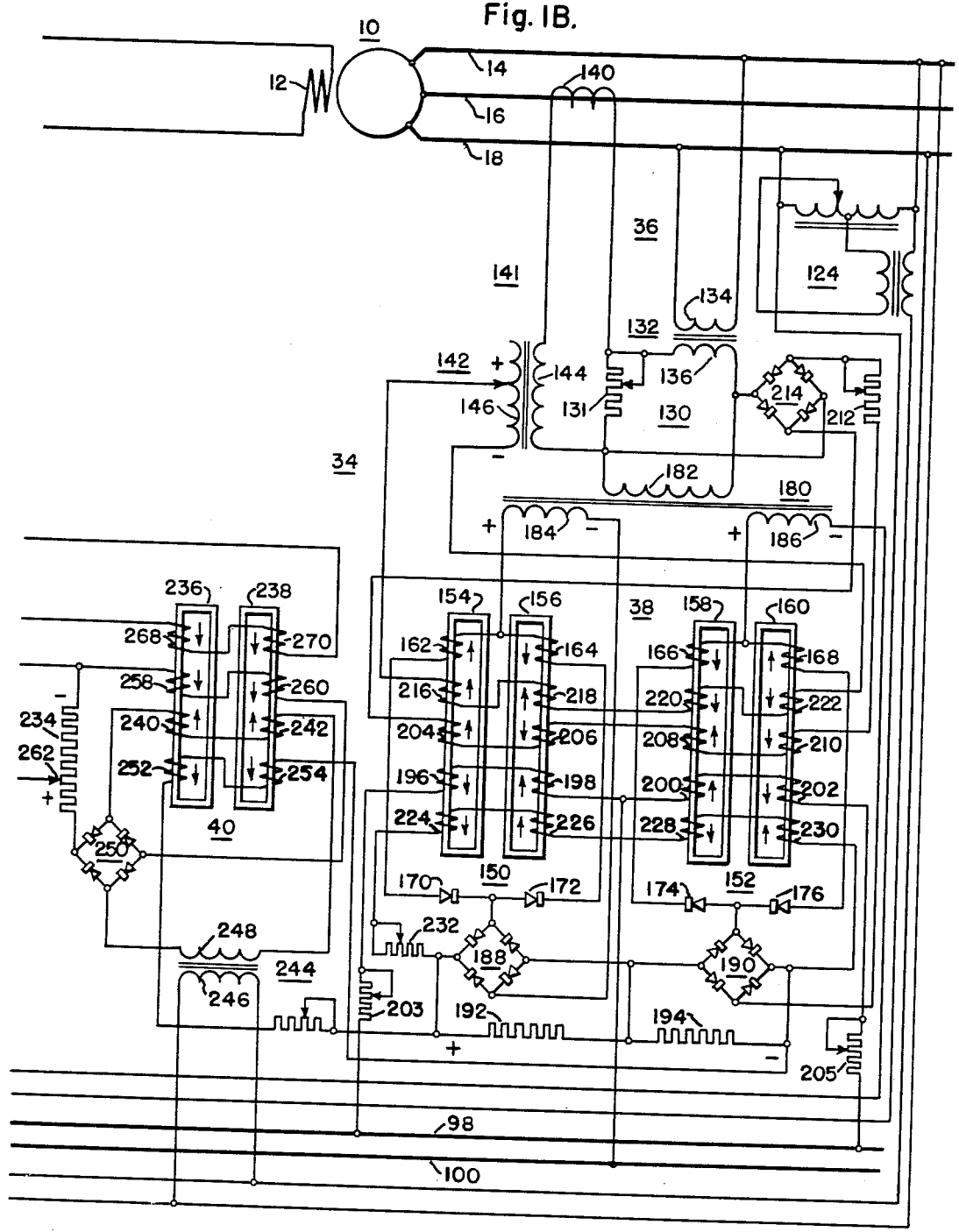

July 31, 1956     J. T. CARLETON ET AL     2,757,332
MINIMUM EXCITATION LIMIT CIRCUITS
Filed Dec. 24, 1953     2 Sheets-Sheet 1
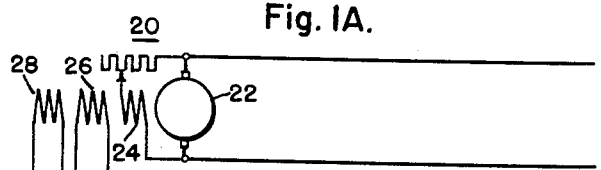
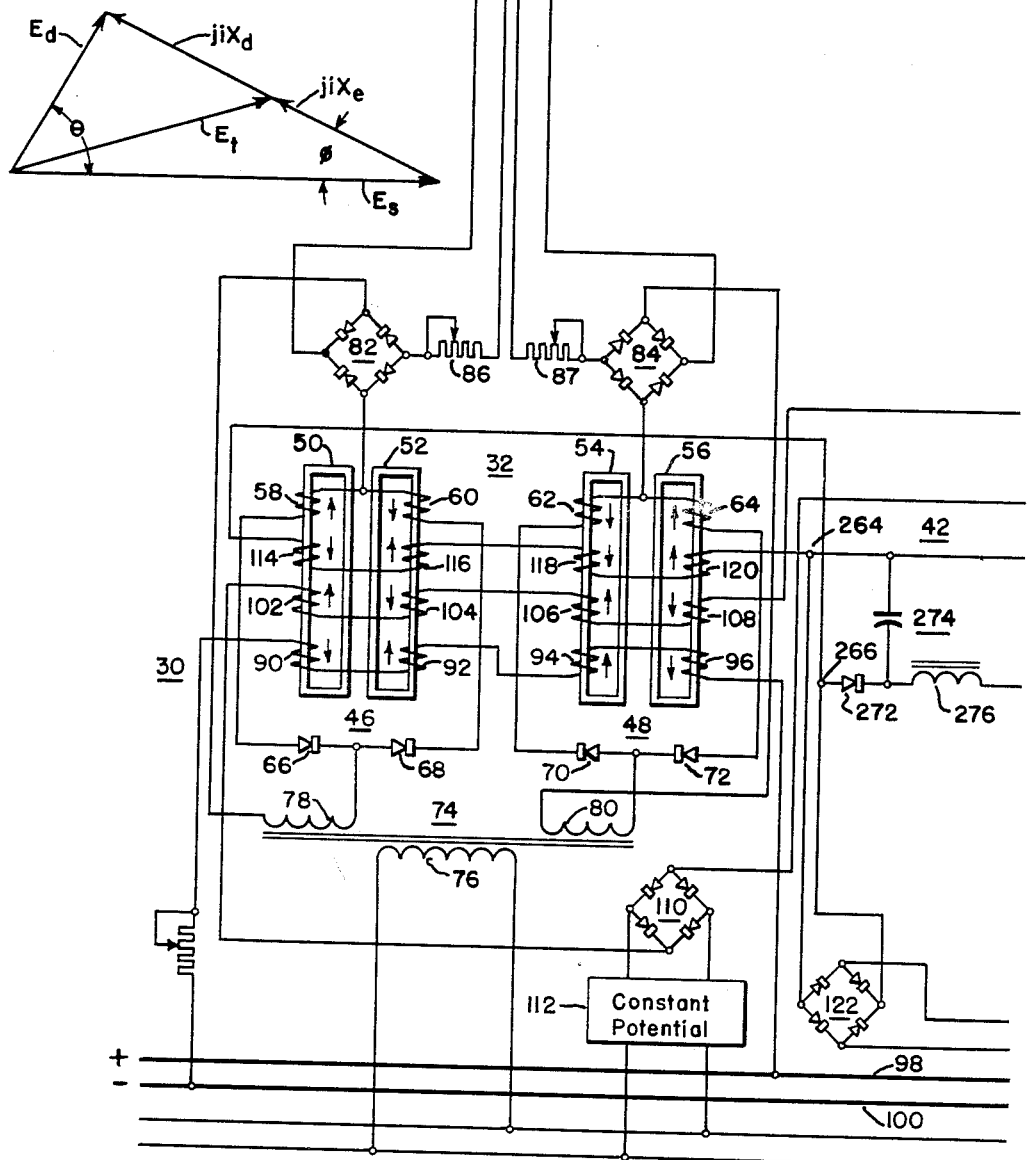
INVENTORS
James T. Carleton &
Donald A. Burt
BY
ATTORNEY

United States Patent Office 2,757,332
Patented July 31, 1956

2,757,332

MINIMUM EXCITATION LIMIT CIRCUITS

James T. Carleton and Donald A. Burt, Pittsburgh, Pa., assignors to Westinghouse Electric Corporation, East Pittsburgh, Pa., a corporation of Pennsylvania Application December 24, 1953, Serial No. 400,166

11 Claims. (Cl. 322—25)

This invention relates to generator regulator systems and more particularly to minimum excitation limit circuits associated therewith.

In addition to maintaining the output voltage of a generator substantially constant, it is also desirable to provide a minimum excitation limit circuit for the generator so that the generator will not fall out of step. The minimum excitation limit circuits of the prior art have many disadvantages. For instance, many of these prior art minimum excitation limit circuits are responsive to the field voltage of the generator and therefore are subject to changes in the temperature of the air surrounding the generator. In addition, many of these prior art minimum excitation limit circuits cannot safely be adjusted to a magnitude closely approaching the pull out point for the generator. Therefore, the generator associated with this prior art minimum excitation limit circuit is not able to take full advantage of its leading power factor characteristic.

A still further disadvantage of many of the prior art minimum excitation circuits is that the minimum excitation limit varies with changes in the magnitude of the system voltage as effected by changes in the magnitude of the load or by changes in the number of generators connected to the overall system. Another disadvantage of many of the prior art minimum excitation circuits is that the magnitude of the minimum excitation limit cannot readily be changed from one magnitude to another.

An object of this invention is to provide a regulating system for a dynamo-electric machine in which provision is made for insuring minimum excitation of the machine.

Another object of this invention is to provide for obtaining a minimum excitation limit for a generator which does not vary even though the magnitude of the system voltage varies due to, for instance, changes in the magnitude of the load or changes in the number of generators connected to the system.

A further object of this invention is to provide readily adjustable means for changing the magnitude of the minimum excitation limit for a generator.

A still further object of this invention is to provide a minimum excitation limit circuit for a generator which circuit is substantially independent of changes in the temperature of the air surrounding the generator.

Another object of this invention is to provide for obtaining a minimum excitation limit circuit for a generator by means of apparatus comprising static components.

Still another object of this invention is to provide a minimum excitation limit circuit for a generator which can be adjusted so as to obtain a limit that closely approaches the pull out point for the generator, by so correlating a magnetic amplifier with a sensing circuit, which produces at its output a measure of the system voltage and a measure of the sum of the external reactance voltage drop of the electrical system and the synchronous reactance voltage drop of the generator, that a predetermined voltage is produced at the output of the magnetic amplifier that is indicative of whether the voltage behind the synchronous reactance of the generator is less or greater than 90° out of leading phase relationship with respect to the system voltage, to thus control the minimum excitation limit for the generator and permit the generator to take advantage of its leading power factor characteristic.

Other objects of this invention will become apparent from the following description when taken in conjunction with the accompanying drawings in which:

Figures 1A and 1B are a schematic diagram of apparatus and circuits illustrating this invention; and Fig. 2 is a vector diagram illustrating the various current and voltage components that are obtained by utilizing the minimum excitation limit circuit as shown in Fig. 1.

Referring to Figs. 1A and 1B, there is illustrated a three-phase non-salient pole generator 10 having a field winding 12. In this instance, the generator 10 is disposed to supply energy to line conductors 14, 16 and 18 which are a part of an electrical system. In order to obtain an excitation voltage across the field winding 12 of relatively large magnitude, an exciter 20 is provided. In this instance, the exciter 20 comprises an armature 22 which supplies current to the field winding 12 of the generator 10, a self-exciting winding 24 which is connected in shunt with the armature 22, and buck and boost field windings 26 and 28, respectively, the purpose of which will be explained hereinafter. In order to maintain the output voltage of the generator 10 substantially constant, a regulator loop 30, comprising a push-pull magnetic amplifier 32, is interconnected between the output of the generator 10 and the buck and boost field windings 26 and 28 of the exciter 20.

In accordance with the teachings of this invention, a minimum excitation limit circuit 34 is connected to the output of the generator 10 and cooperates with the push-pull magnetic amplifier 32, of the regulator loop 30, to prevent the generator 10 from falling out of step. In general, the minimum excitation limit circuit 34 comprises a sensing circuit 36, and a push-pull magnetic amplifier 38 which cooperates with the sensing circuit 36 to obtain a voltage at its output that is indicative of whether the voltage behind the synchronous reactance of the generator 10 is greater or less than 90° out of leading phase relationship with respect to the system voltage. In addition, the minimum excitation limit circuit 34 comprises a saturable reactor 40 which is responsive to the output voltage of the push-pull magnetic amplifier 38, and a shunting circuit 42 which shunts a portion of the control signal for the push-pull magnetic amplifier 32 away from the amplifier 32 once the magnitude of the output voltage of the saturable reactor 40 reaches a predetermined magnitude, to thereby maintain a predetermined and substantially constant minimum excitation limit for the generator 10.

As hereinbefore mentioned, the regulator loop 30 is provided in order to maintain the magnitude of the output voltage of the generator 10 substantially constant. For purposes of clarity, the components and operation of the regulator loop 30 will be described before describing the various components and operation of the minimum excitation limit circuit 34.

As illustrated, the push-pull magnetic amplifier 32 is of standard construction and comprises two main sections 46 and 48. The section 46 comprises two magnetic core members 50 and 52, and the section 48 comprises two magnetic core members 54 and 56. In this instance, load windings 58, 60, 62 and 64 are disposed in inductive relationship with the magnetic core members 50, 52, 54 and 56, respectively. As is customary, self-saturation for the magnetic amplifier 32 is obtained by connecting in series circuit relationship with the load windings 58, 60, 62 and 64, self-saturating rectifiers 66, 68, 70 and 72, respectively.

In order to form a doubler circuit of the section 46, the series circuit including the load winding 58 and the self-saturating rectifier 66 is connected in parallel circuit relationship with the series circuit including the load winding 60 and the self-saturating rectifier 68. Likewise, in order to form a doubler circuit of the section 48, the series circuit including the load winding 62 and the self-saturating rectifier 70 is connected in parallel circuit relationship with the series circuit including the load windings 64 and the self-saturating rectifier 72.

Energy for the load windings 58, 60, 62 and 64, of the magnetic amplifier 32, is received from a transformer 74 having a primary winding 76, which in this instance is responsive to the output voltage of the generator 10, and secondary winding sections 78 and 80. As illustrated, a full-wave dry type load rectifier 82 is interconnected with the hereinbefore described parallel circuit of the section 46, and with the secondary winding section 78, of the transformer 74, in order to produce a direct current output for the section 46. In like manner, a full-wave dry type load rectifier 84 is interconnected with the hereinbefore described parallel circuit of the section 48, and with the secondary winding section 80, of the transformer 74, in order to obtain a direct-current output for the section 48.

In this instance, the boost field winding 28 of the exciter 20 is responsive to the output of the load rectifier 82, and the buck field winding 26 of the exciter 20 is responsive to the output of the load rectifier 84. In operation, the buck field winding 26 opposes the boost field winding 28. However, in order to obtain a substantially equal and opposite effect, as produced by the buck and boost field windings 26 and 28, when the output voltage of the generator 10 is at its regulated value, variable resistors 86 and 87 are connected in series circuit relationship with the boost field winding 28 and the buck field winding 26, respectively.

For the purpose of biasing each of the sections 46 and 48 of the magnetic amplifier 32 to approximately half its output, biasing windings 90, 92, 94 and 96 are disposed in inductive relationship with the magnetic core members 50, 52, 54 and 56, respectively. In particular, the biasing windings 90, 92, 94 and 96 are connected in series circuit relationship with one another, the series circuit being connected to conductors 98 and 100 which have applied thereto a substantially constant direct-current voltage. In operation, the current flow through the biasing windings 90, 92, 94 and 96 produces a flux in their respective magnetic core members that opposes the flux produced by the current flow through the load windings 58, 60, 62 and 64, respectively.

In order to obtain a reference point from which to operate from in each of the sections 46 and 48 of the magnetic amplifier 32, reference windings 102, 104, 106 and 108 are disposed in inductive relationship with the magnetic core members 50, 52, 54 and 56, respectively. The reference windings 102, 104, 106 and 108 are so disposed on their respective magnetic core members 50, 52, 54 and 56 that the current flow through the reference windings 102, 104 produces a flux that opposes the flux produced by the respective biasing windings 90 and 92, and that the current flow through the reference windings 106 and 108 produces a flux that is additive to the flux produced by the respective biasing windings 94 and 96. As illustrated, the reference windings 102, 104, 106 and 108 are connected in series circuit relationship with one another and with other windings which will be described hereinafter, the series circuit being connected to the output terminals of a full-wave dry type rectifier 110. In order that the current flow through the reference windings 102, 104, 106 and 108 remain substantially constant the input terminals of the rectifier 110 are connected to a constant potential device 112 which produces at its output a substantially constant alternating-current voltage irrespective of the magnitude of the output voltage of the generator, to which the constant potential device 112 is responsive.

As is customary, control windings 114, 116, 118 and 120 are disposed in inductive relationship with the magnetic core members 50, 52, 54 and 56, respectively. In particular, the control windings 114, 116, 118 and 120 are connected in series circuit relationship with one another, the series circuit being connected to the output terminals of a full-wave dry type rectifier 122. The input terminals of the rectifier 122 are connected to the line conductors 14 and 18 through a variac 124. A very small change in the magnitude of the current flow through the control windings 114, 116, 118 and 120 can be obtained by adjusting the variac 124.

The control windings 114, 116, 118 and 120 are so disposed on their respective magnetic core members 50, 52, 54 and 56 that when current flows therethrough a flux is produced in the respective magnetic core members that opposes the flux produced by the current flow through the respective reference windings 102, 104, 106 and 108. Thus, in operation when the output voltage of the generator 10 increases to a value above its regulated value the current flow through the control windings 114, 116, 118 and 120 increases, to thereby decrease the output current from the section 46 of the amplifier 32 and increase the output current from the section 48 of the push-pull magnetic amplifier 32. Such an action increases the current flow through the buck field winding 26 of the exciter 20 and decreases the current flow through the boost field winding 28, to thereby decrease the output voltage of the exciter 20. A decrease in the output voltage of the exciter 20 decreases the magnitude of the voltage across the field winding 12 of the generator 10 to thereby return the output voltage of the generator 10 to its regulated value.

On the other hand, a decrease in the output voltage of the generator 10 to a value below its regulated value decreases the magnitude of the current flow through the control windings 114, 116, 118 and 120. A decrease in the current flow through the control windings 114, 116, 118 and 120 unbalances the push-pull magnetic amplifier 32 in such a direction that the output current from the section 46, of the amplifier 32, increases and the output current from the section 48 decreases. Such an action increases the magnitude of the current flow through the boost field winding 28, of the exciter 20, and decreases the magnitude of the current flow through the buck field winding 26. This in turn increases the magnitude of the output voltage of the exciter 20 as well as the magnitude of the voltage across the field winding 12 of the generator 10, to thereby return the magnitude of the output voltage of the generator 10 to its regulated value.

The minimum excitation limit circuit 34 will now be described. Broadly, the sensing circuit 36 comprises circuit means 130, responsive to both a measure of the terminal voltage of the generator 10 and to a measure of the output current of the generator 10, for obtaining a predetermined voltage measure of the system voltage. Specifically, the circuit means 130 comprises a variable impedance member or resistor 131 and a potential transformer 132 having a primary winding 134 and a secondary winding 136. The primary winding 134 of the potential transformer 132 is connected between phases 1 and 3, in other words, to the line conductors 14 and 18, thereby rendering the circuit means 130 responsive to a measure of the terminal voltage of the generator 10. A voltage proportional to the terminal voltage of the generator 10 appears across the secondary winding 136. On the other hand, the variable resistor 131 is connected to a main current transformer 140, thereby rendering the circuit means 130 responsive to a measure of the output current of the generator 10. As illustrated, the variable resistor 131 is connected in series circuit relationship with the secondary winding 136 of the potential transformer 132. When so connected a voltage proportional to the system voltage appears across the series circuit including the resistor 131 and the secondary winding 136. This can more clearly be seen by referring to Fig. 2 in which the vector $E_t$ represents the terminal voltage of the generator 10, and vector $E_s$ represents the system voltage. The vector $jiX_e$ represents the external reactance voltage drop of the electrical system, and a voltage measure of this external reactance voltage drop appears across the variable resistor 131. By adjusting the resistor 131 a proper measure of the external reactance voltage drop of the electrical system can be obtained.

It is to be noted that the current is measured on phase 2 in order to shift its phase with respect to $E_t$ by 90°. The alternating-current voltage developed across the resistor 131 can then be made proportional to and in phase with the external reactance voltage drop $jiX_e$. By adding the alternating-current voltage across the resistor 131 to the alternating-current voltage across the secondary winding 136 the system voltage $E_s$ can be reproduced. In the embodiment illustrated, the proper phase relationship between the measure of the output current of the generator 10 and the measure of the terminal voltage of the generator 10 for a given operating condition is obtained by connecting the primary winding 134 of the transformer 132 between phases 1 and 3 and by electrically associating the main current transformer 140 with phase 2. However, it is to be understood that the proper phase relationship between the measure of the terminal voltage and the measure of the output current of the generator 10 for a given operating condition could be obtained by disposing a proper phase shifting circuit (not shown) between the main current transformer 140 and the variable resistor 131.

The sensing circuit 36 also includes circuit means 141 for obtaining a predetermined current measure proportional to the sum of the synchronous reactance voltage drop of the generator 10 and the external reactance voltage drop of the electrical system. In particular, an auxiliary current transformer 142, having a primary winding 144 and a tapped secondary winding 146, is so interconnected with the main current transformer 140 and with the variable resistor 131 that the alternating-current output from the auxiliary current transformer 142, in particular from the secondary winding 146, is proportional to the sum of the synchronous reactance voltage drop of the generator 10 and the external reactance voltage drop of the electrical system. In particular, the variable resistor 131 is connected in series circuit relationship with the primary winding 144 of the auxiliary current transformer 142, the series circuit being connected across the main current transformer 140. Thus, by adjusting the tapped secondary winding 146 a proper measure of the sum of the synchronous reactance voltage drop of the generator 10 voltage drop and the external reactance voltage drop of the electrical system can be obtained.

In Fig. 2 the synchronous reactance of the generator 10 is represented by the vector $jiX_d$ and the sum of the synchronous reactance voltage drop of the generator 10 and the external reactance voltage drop of the electrical system is represented by the sum of the vectors $jiX_d$ and $jiX_e$. The remaining vector $E_d$ illustrated in Fig. 2 represents the voltage behind the synchronous reactance of the generator 10. If the angle $\theta$ between the vector $E_d$ and the vector $E_s$ becomes greater than 90° then the generator 10, when a non-salient pole generator, will fall out of step when manually controlled. In other words, if cosine $\phi$ $(jiX_d+jiX_e)$ is less than $E_s$ the generator 10 will not fall out of step. However, if the quantity cosine $\phi(jiX_d+jiX_e)$ becomes greater than vector $E_s$ then the generator 10 will fall out of step.

In order to obtain a voltage proportional to the difference between $E_s$ and cosine $\phi$ $(jiX_d+jiX_e)$ and a voltage that is indicative of whether $E_s$ is of greater or lesser magnitude than the quantity cosine $\phi$ $(jiX_d+jiX_e)$, the push-pull magnetic amplifier 38 is rendered responsive to the voltage across the series circuit, including the variable resistor 131 and the secondary winding 136 of the potential transformer 132, and to the current flowing from the second winding 146 of the auxiliary current transformer 142.

The push-pull magnetic amplifier 38 comprises two main sections 150 and 152. The section 150 includes magnetic core members 154 and 156 and the section 152 includes magnetic core members 158 and 160. Load windings 162, 164, 166 and 168 are disposed in inductive relationship with the core members 154, 156, 158 and 160, respectively. Self-saturation of the magnetic amplifier 38 is obtained by connecting in series circuit relationship with the load windings 162, 164, 166 and 168, self-saturating rectifiers 170, 172, 174 and 176, respectively. In order to establish a doubler circuit for the section 150 the series circuit including the load winding 162 and the self-saturating rectifier 170 is connected in parallel circuit relation with the series circuit including the load winding 164 and the self-saturating rectifier 172. In like manner, in order to establish a doubler circuit for the section 152, the series circuit including the load winding 166 and the self-saturating rectifier 174 is connected in parallel circuit relationship with the series circuit including the load winding 168 and the self-saturating rectifier 176.

In order to provide the proper magnitude of voltage for the load windings 162, 164, 166 and 168 of the push-pull magnetic amplifier 38 and in order to provide isolated voltage supplies for the sections 150 and 152, a transformer 180, having a primary winding 182 and two secondary winding sections 184 and 186, is provided. As illustrated, the primary winding 182 is connected across the series circuit including the variable resistor 131 and the secondary winding 136 of the potential transformer 132. Therefore, the transformer 180 is responsive to a measure of the system voltage $E_s$.

The load windings 162 and 164 of the section 150 of the push-pull magnetic amplifier 38 are rendered responsive to the voltage across the secondary winding section 184 of the transformer 180 by interconnecting the previously described parallel circuit of the section 150 with the secondary winding section 184 and with a full-wave dry type load rectifier 188. In like manner, the load windings 166 and 168 of the section 152 of the push-pull magnetic amplifier 38 are rendered responsive to the voltage across the secondary winding section 186 by interconnecting the previously described parallel circuit of the section 152 with the secondary winding section 186 and with a full-wave dry type load rectifier 190. On the other hand, the difference in the outputs of the sections 150 and 152 of the push-pull magnetic amplifier 38 is obtained by so interconnecting load resistors 192 and 194 with themselves and with the output terminals of the rectifiers 188 and 190, respectively, that the difference in the outputs of the sections 150 and 152 appears across the combined load resistors 192 and 194.

For the purpose of biasing the sections 150 and 152 of the push-pull magnetic amplifier 38 to approximately half output, biasing windings 196, 198, 200 and 202 are disposed in inductive relationship with the magnetic core members 154, 156, 158 and 160, respectively. As illustrated, the biasing windings 196 and 198 are connected in series circuit relationship with one another and with a variable resistor 203, the series circuit being connected to the conductors 98 and 100 which have applied thereto a substantially constant direct-current voltage. The biasing windings 200 and 202 are also connected in series circuit relationship with one another and with a variable resistor 205, this series circuit also being connected to the conductors 98 and 100. Each of the biasing windings 196, 198, 200 and 202 is so disposed with respect to its respective load winding 162, 164, 166 and 168 that the current flow through the biasing windings 196, 198, 200 and 202 produces a flux in the respective core members 154, 156, 158 and 160 that opposes the flux produced by the current flow through the respective load windings 162, 164, 166 and 168.

Direct-current control windings 204, 206, 208, and 210 are disposed in inductive relationship with the magnetic core members 154, 156, 158 and 160, respectively. The direct-current control windings 204, 206, 208 and 210 are connected in series circuit relationship with one another and with a variable resistor 212, the series circuit being connected to the output terminals of a full-wave dry type rectifier 214. The input terminals of the rectifier 214 are connected across the series circuit including the variable resistor 131 and the secondary winding 136 of the potential transformer 132. Therefore, the direct-current control windings 204, 206, 208 and 210 are responsive to a voltage that is proportional to the system voltage $E_s$. Further, the direct-current control windings 204 and 206 of the section 150 of the magnetic amplifier 38 are so disposed on their respective core members 154 and 156 that the current flow through the control windings 204 and 206 produces a flux in the respective core members 154 and 156 that aids the flux produced by the current flow through the respective load windings 162 and 164. However, the direct-current control windings 208 and 210 of the section 152 are so disposed on their respective core members 158 and 160 that the current flow through the control windings 208 and 210 produces a flux in the respective core members 158 and 160 that opposes the flux produced by the current flow through the load windings 166 and 168, respectively.

Alternating-current control windings 216, 218, 220 and 222 are also disposed in inductive relationship with the core members 154, 156, 158 and 160, respectively. In order to render the alternating-current control windings 216, 218, 220 and 222 responsive to a measure of $i(X_e+X_d)$, the series connected alternating-current control windings 216, 218, 220 and 222 are connected to the secondary winding 146 of the auxiliary current transformer 140. It is to be noted that the alternating-current control windings 216, 218, 220 and 222 are so disposed on their respective magnetic core members 154, 156, 158 and 160 that during the reset portion of the operation, when the respective load windings 162, 164, 166 and 168 are not carrying load current, the flux produced by the current flow through the alternating-current control windings 216, 218, 220 and 222 opposes the flux produced by the current flow through the respective direct-current control windings 204, 206, 208 and 210. The relative magnitudes of the current flow through the alternating-current control windings 216, 218, 220 and 222 and through the direct-current control windings 204, 206, 208 and 210 determines the polarity and the magnitude of the output voltage of the push-pull magnetic amplifier 38. This will be explained more fully hereinafter in the description of the operation of the minimum excitation circuit 34.

Feedback windings 224, 226, 228 and 230 are also disposed in inductive relationship with the magnetic core members 154, 156, 158 and 160, respectively. The feedback windings 224, 226, 228 and 230 are responsive to the output voltage of the push-pull magnetic amplifier 38 and are so disposed on their respective core members 154, 156, 158 and 160 that the current flow therethrough produces a flux that opposes the net flux produced in the respective core members by the alternating-current control windings 216, 218, 220 and 222 and by the direct-current control windings 204, 206, 208 and 210. As illustrated, the feedback windings 224, 226, 228 and 230 are connected in series circuit relationship with one another and with a variable resistor 232, which can be adjusted to determine the magnitude of the current flow through the feedback windings 224, 226, 228 and 230. One end of this series circuit is connected to one end of the load resistor 192 and the other end of this series circuit is connected to one end of the load resistor 194. Thus, a negative feedback is provided by the feedback windings 224, 226, 228 and 230 in order to improve the linearity of the output voltage of the push-pull magnetic amplifier 38.

The output voltage of an alternating-current controlled balanced push-pull magnetic amplifier is proportional to the magnitude of the alternating current flowing through its alternating-current control windings times the cosine of the angle between its supply voltage and the alternating current flowing through its alternating-current control windings. Therefore, considering only the alternating-current control windings 216, 218, 220 and 222 and the load windings 162, 164, 166, and 168 of the push-pull magnetic amplifier 38, the output voltage of the amplifier 38 is proportional to $\cos \phi\, i(X_e+X_d)$, where $i(X_e+X_d)$ is the voltage proportional to the current flowing through the alternating-current control windings 216, 218, 220 and 222, and $\phi$ is the angle between $E_s$, the supply voltage applied to the load windings 162, 164, 166 and 168, and $i(X_e+X_d)$, the voltage proportional to the current flowing through the alternating-current control windings 216, 218, 220 and 222. However, also taking into consideration the effect produced by the direct-current control windings 204, 206, 208 and 210, the output voltage of the push-pull magnetic amplifier 38 is proportional to $E_s - \cos \phi\, i(X_e+X_d)$, since in operation the current flow through the direct-current control windings 204, 206, 208 and 210 is proportional to $E_s$ and the action of the direct-current control windings 204, 206, 208 and 210 opposes the action of the alternating-current control windings 216, 218, 220 and 222, respectively.

It is to be noted that changes in the magnitude of the voltage $E_s$ across the series circuit, including the resistor 131 and the secondary winding 136, as applied to the load windings 162, 164, 166 and 168 do not effect a change in the magnitude or polarity of the output voltage of the push-pull magnetic amplifier 38.

The saturable reactor 40 is provided in order to amplify the output of the push-pull magnetic amplifier 38 and to produce across a variable impedance member or resistor 234 a voltage that varies in accordance with the magnitude and polarity of the output voltage of the push-pull magnetic amplifier 38. In this instance, the saturable reactor 40 comprises magnetic core members 236 and 238. Load windings 240 and 242 are disposed in inductive relationship with the magnetic core members 236 and 238, respectively. In order to supply energy to the load windings 240 and 242 a potential transformer 244, having a primary winding 246 and a secondary winding 248, is interconnected with a full-wave dry type load rectifier 250 and with the load windings 240 and 242. Specifically, the primary winding 246 of the transformer 244 is connected to the line conductors 14 and 18. On the other hand, the secondary winding 248 of the transformer 244 is connected in series circuit relationship with the load windings 240 and 242, the series circuit being connected to the input terminals of the load rectifier 250.

In order to render the saturable reactor 40 responsive to the output voltage of the push-pull magnetic amplifier 38 control windings 252 and 254 are disposed in inductive relationship with the magnetic core members 236 and 238, respectively. In particular, the control windings 252 and 254 are connected in series circuit relationship with one another, the series circuit being connected across the load resistors 192 and 194 of the push-pull magnetic amplifier 38.

For the purpose of providing a higher gain for the saturable reactor 40, feedback windings 258 and 260 are disposed in inductive relationship with the magnetic core members 236 and 238, respectively. As illustrated, the feedback windings 258 and 260 are connected in series circuit relationship with the variable resistor 234, the series circuit being connected to the output terminals of the load rectifier 250. The feedback windings 258 and 260 are so disposed on their respective core members 236 and 238 that the current flow through the feedback windings 258 and 260 produces a flux in the respective core members 236 and 238 that aids the flux produced by the current flow through the control windings 252 and 254 when the output voltage of the push-pull magnetic amplifier 38 is of the polarity shown. Thus, the feedback windings 258 and 260 provide positive feedback for the saturable reactor 40.

In order to provide a voltage between the upper end of the variable resistor 234, as illustrated, and the movable contact member 262 that is of equal magnitude to the voltage between the points 264 and 266, when the current flow through the control windings 252 and 254 of the saturable reactor 40 is of zero magnitude, reference windings 268 and 270 are disposed in inductive relationship with the core members 236 and 238, respectively. Specifically, the reference windings 268 and 270 are connected in series circuit relationship with one another and in series circuit relationship with the reference windings 102, 104, 106, and 108 of the push-pull magnetic amplifier 32. This latter series circuit is connected to the output terminals of the rectifier 110. Thus, a substantially constant current flows through the reference windings 268 and 270 of the saturable reactor 40.

In order to prevent the minimum excitation circuit 34 from supplying current to the control windings 114, 116, 118, and 120 of the push-pull magnetic amplifier 32 when the magnitude of the voltage between the upper end of the variable resistor 234, as illustrated, and the movable contact member 262 is of greater magnitude than the magnitude of the voltage between the points 264 and 266, a rectifier 272 is provided. Specifically, the rectifier 272 connects a predetermined portion of the variable resistor 234 in parallel circuit relationship with the series connected control windings 114, 116, 118, and 120 of the push-pull magnetic amplifier 32. The voltage across the predetermined portion of the variable resistor 234 is filtered by means of a filter 274 in order to give a low ripple voltage and thus insure proper action of the rectifier 272. The filter choke 276 of the filter 274 is designed to saturate when the rectifier 272 begins to conduct in the forward direction, to thereby reduce the response time.

Before putting the minimum excitation circuit 34 into operation, certain adjustments should first be made. For instance, the variable resistors 203 and 205 should be adjusted so as to obtain approximately half output for each of the sections 150 and 152 of the push-pull magnetic amplifier 38. In addition, the variable resistor 131 should be adjusted so as to obtain the proper valve for $jiX_e$. Further, the tapped secondary winding 146 of the auxiliary current transformer 142 should be adjusted so as to obtain the proper value for $j(X_e+X_d)i$. Then the variable resistor 212 is adjusted so that the flux produced by the current flow through the alternating-current control windings 216, 218, 220, and 222 is during the reset portion of the operation equal and opposite to the flux produced by the current flow through the direct-current control windings 204, 206, 208, and 210 when the voltage $E_d$ behind the synchronous reactance of the generator 10 is at 90° leading with respect to the system voltage $E_s$. The movable contact member 262 of the resistor 234 should also be adjusted so that the voltage between the contact member 262 and the upper end of the variable resistor 234, as illustrated, is equal in magnitude to the voltage between the points 264 and 266 when the current flow through the control windings 252 and 254 of the saturable reactor 40 is of zero magnitude. Thus, the voltage between the movable contact member 262 and the upper end of the resistor 234, as illustrated, is of equal magnitude to the voltage between the points 264 and 266 when the voltage $E_d$ behind the synchronous reactance of the generator 10 is at 90° leading with respect to the system voltage $E_s$.

The operation of the minimum excitation circuit 34 will now be described. Assuming the conditions of the electrical system are such that the voltage $E_d$ behind the synchronous reactance of the generator 10 is at less than 90° leading with respect to the system voltage $E_s$ then the system voltage $E_s$ is of greater magnitude than the quantity $\cos \phi i(X_e+X_d)$. Therefore, the output of the rectifier 214 is such as to produce a current flow through the direct-current control windings 204, 206, 208, and 210 that effects a flux in the respective core members 154, 156, 158, and 160 that is greater in magnitude than the flux produced by the current flow through the alternating-current control windings 216, 218, 220, and 222.

Assuming that the upper end of the secondary winding 146 of the transformer 140, as illustrated, is at a positive polarity with respect to the lower end, and assuming further that the left ends of the secondary winding sections 184 and 186 of the transformer 180, as illustrated, are at a positive polarity with respect to their right ends, then current flows from the left end of the secondary winding section 184 through the load winding 162 of the section 150, the self-saturating rectifier 170, the load rectifier 188, the load resistor 192, and the load rectifier 188, to the right end of the secondary winding section 184. At the same time, current also flows from the left end of the secondary winding section 186 through the load winding 168 of the section 152, the self-saturating rectifier 176, the load rectifier 190, the load resistor 194, and the load rectifier 190, to the right end of the secondary winding section 186 of the transformer 180.

During this same half-cycle, when the voltage across the secondary winding sections is of a polarity as shown, current also flows from the top on the secondary winding section 146 through the alternating-current control windings 216, 218, 220, and 222, to the lower end of the secondary winding 146. The current flow through the alternating-current control windings 206 and 208, during this portion of the cycle, is in such a direction as to produce a flux in the core members 156 and 158, respectively, that opposes the flux produced by the current flow through the associated direct-current control windings 218 and 220, respectively. Thus, during this portion of the cycle, the reset operation is taking place in the core members 156 and 158, the flux level to which the core members 156 and 158 are reset being determined by the relative magnitudes of the fluxes produced by the respective alternating-current control windings 218 and 220 and the respective direct-current control windings 206 and 208. Since it was assumed that the system voltage $E_s$ was greater in magnitude than the quantity $\cos \phi i(X_e+X_d)$, the magnitude of the flux produced by the direct-current control windings 206 and 208 is greater than the magnitude of the flux produced by the alternating-current control windings 218 and 220. Since the resultant flux produced by the direct-current control winding 208 and by the alternating-current control winding 220 is in a direction to aid the flux produced by the biasing winding 200, and the resultant flux produced by the direct-current control winding 206 and by the alternating-current control winding 218 is in a direction to oppose the flux produced by the biasing winding 198, the magnetic core member 158 is reset to a lower flux level than is the core member 156. Therefore, during the next half-cycle of operation when the load windings 164 and 166 are energized, the output from the section 150 is of greater magnitude than the output from the section 152. Thus, under the assumed conditions, the left side of the load resistor 192, as shown, is at a positive polarity with respect to the right end of the load resistor 194.

During this same half-cycle of the operation when the tap of the secondary winding 146 of the transformer 140 is at a positive polarity with respect to the lower end of the secondary winding 146, the energization of the load windings 162 and 168 effects a driving of the core members 154 and 160, respectively, to saturation.

During the next half-cycle of the operation when the lower end of the secondary winding 146, as shown, is at a positive polarity with respect to its upper end, and when the right ends of the secondary winding sections 184 and 186 of the transformer 180 are at a positive polarity with respect to their left ends, current flows from the right end of the secondary winding section 184 through the load rectifier 188, the load resistor 192, the load rectifier 188, the self-saturating rectifier 172, and the load winding 164, to the left end of the secondary winding section 184. During this same half-cycle of the operation, current flows from the right end of the secondary winding section 186 of the transformer 180 through the load rectifier 190, the load resistor 194, the load rectifier 190, the self-saturating rectifier 174, and the load winding 166, to the left end of the secondary winding section 186 of the transformer 180. Thus, during this half-cycle of the operation, the core members 156 and 158 are driven to saturation, the relative magnitudes of the voltages across the load resistors 192 and 194 being determined by the level to which each of the core members 156 and 158 has been reset during the previous half-cycle of the operation as hereinbefore described.

During this same half-cycle of the operation, when the lower end of the secondary winding 146 of the transformer 140, as shown, is at a positive polarity with respect to its upper end, the current flow through the alternating-current control windings 222, 220, 218, and 216 is in such a direction as to produce a flux in the core members 154 and 160 that opposes the flux produced by the current flow through the associated direct-current control windings 204 and 210, respectively. Thus, during this half-cycle of the operation, the core members 154 and 160 are reset to a flux level as determined by the relative magnitudes of the fluxes produced by the alternating-current control windings 216 and 222 and the associated direct-current control windings 204 and 210, respectively. Since it was assumed that the magnitude of the system voltage $E_s$ was of greater magnitude than the quantity $\cos \phi i(X_e + X_d)$, the resultant flux produced by the alternating-current control winding 216 and the direct-current control winding 204 is in a direction to oppose the flux produced by the biasing winding 196. In like manner, the resultant flux produced by the alternating-current control winding 222 and by the direct-current control winding 210 is in a direction to aid the flux produced by the biasing winding 202. Therefore, the magnetic core member 160 is reset to a lower flux level than is the core member 154. Thus, under the assumed conditions, the output voltage from the section 150, when the load windings 162 and 168 are energized, is greater than the output voltage from the section 152. This, of course, is the same result as was produced when the load windings 164 and 166 were energized during the previous half-cycle of the operation.

Since under the above-assumed conditions, the left end of the load resistor 192, as shown, is at a positive polarity with respect to the right end of the load resistor 194, current flows in such a direction through the control windings 252 and 254 of the saturable reactor 40 as to produce a flux in the core members 236 and 238, respectively, that aids the flux produced by the current flow through the reference windings 268 and 270, respectively. Therefore, the magnitude of the voltage between the movable contact member 262 and the upper end of the resistor 234, as shown, is greater than the magnitude of the voltage between the points 264 and 266. Under such a condition, the rectifier 272 blocks the voltage across the resistor 234 and the minimum excitation circuit 34 has no effect upon the push-pull magnetic amplifier 32 which is incorporated in the regulator loop 30. Therefore, under such conditions, the regulator loop 30 continues to maintain the output voltage of the generator 10 substantially constant.

As hereinbefore mentioned, when the voltage $E_d$ behind the synchronous reactance of the generator 10 is at 90° leading with respect to the system voltage $E_s$, the flux produced in the respective core members by the alternating-current control windings 216, 218, 220, and 222 is equal in magnitude to the flux produced in the respective core members by the direct-current control windings 204, 206, 208, and 210. Therefore, under this assumed condition, the output voltage from the push-pull magnetic amplifier 38 is of zero magnitude, and substantially no current flows through the control windings 252 and 254 of the saturable reactor 40.

However, assuming the voltage $E_d$ behind the synchronous reactance of the generator 10 increases its angle so as to become more than 90° out of leading phase relationship with respect to the system voltage $E_s$, then the magnitude of the flux produced by the alternating-current control windings 216, 218, 220, and 222 is greater than the magnitude of the flux produced by the direct-current control windings 204, 206, 208, and 210 in their respective magnetic core members. Under such a condition, the core members 154 and 156 are during their respective reset portion of the cycle, reset to a lower flux level than are the core members 158 and 160 during their respective reset portion of the cycle. Therefore, the output of the section 152 is greater than the output of the section 150 under such assumed conditions. Thus, the right end of the load resistor 194, as shown, is at a positive polarity with respect to the left end of the load resistor 192. Current then flows from the right end of the load resistor 194 through the control windings 254 and 252 of the saturable reactor 40 to the left end of the load resistor 192. The current flow through the control windings 254 and 252 effects a flux in the core members 238 and 236, respectively, that opposes the flux produced in the core members 238 and 236 by the current flow through the reference windings 270 and 268, respectively. Such an action decreases the magnitude of the voltage between the movable contact member 262 and the upper end of the resistor 234, as shown, to such a value that it is of lesser magnitude than the voltage between the points 264 and 266. This, in turn, effects a shunting of a portion of the control current, as received from the output of the rectifier 122 through the resistor 234. That is, as the voltage between the movable contact member 262 and the upper end of the resistor 234 decreases further below the value of the voltage between the points 264 and 266, a greater portion of the control current is bypassed around the control windings 114, 116, 118, and 120 of the push-pull magnetic amplifier 32 of the regulator loop 30.

With a decrease in the magnitude of the current flow through the control windings 114, 116, 118, and 120 of the push-pull magnetic amplifier 32, the output of the section 46 of the amplifier 32 is increased and the output of the section 48 is decreased. This increases the magnitude of the current flow through the boost field winding 28 of the exciter 20 and decreases the magnitude of the current flow through the buck field winding 26. With such an increase in the magnitude of the current flow through the boost field winding 28, the output voltage of the exciter 20 is increased, to thus increase the magniture of the current flow through the field winding 12 of the generator 10 and thereby prevent the generator 10 from falling out of step.

It is to be understood that if a salient pole generator (not shown) is substituted for the generator 10, then the angle between $E_d$ and $E_s$ may become greater than 90° before the salient pole generator falls out of step. However, the components shown in Figs. 1A and 1B can be adjusted so as to provide a minimum excitation limit based on this angle greater than 90° when utilizing a salient pole generator.

The previously described apparatus is for maintaining a static minimum excitation limit. However, it is to be understood that by retarding the measure of the output current of the generator 10, as taken from phase 2, or by advancing the measure of the terminal voltage of the generator, as taken from phases 1 and 3, the apparatus illustrated can be adjusted so as to maintain a dynamic minimum excitation limit.

The apparatus embodying the teachings of this invention has several advantages. For instance, the operation of the minimum excitation limit circuit 34 is not affected by the temperature of the air surrounding the field winding 12 of the generator 10, as was the case with many of the prior art minimum excitation limit circuits. In addition, the static minimum excitation limit for the generator 10 can be very quickly changed to a new value by merely adjusting the positioning of the movable contact member of the variable resistor 131 and then properly adjusting the tap of the secondary winding 146 of the auxiliary current transformer 142. Further, the minimum excitation limit for the generator 10 does not vary even though the magnitude of the system voltage $E_s$ varies due to, for instance, changes in the magnitude of the load on the generator 10 or due to changes in the number of generators (not shown) connected to the system. Also, it is to be noted that the minimum excitation limit circuit 34 comprises static components. Thus, maintenance problems are minimized. In addition, the limit sensitivity of the minimum excitation circuit is substantially constant.

Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a regulating system for a generator having a field winding and disposed to supply energy to an electrical system, the combination comprising, a sensing circuit comprising, circuit means, responsive to a measure of the terminal voltage of the generator and to a measure of the output current of the generator, for obtaining a predetermined voltage measure of the system voltage, said terminal voltage measure and said output current measure having a predetermined phase relationship for a given operating condition, and other circuit means, responsive to the said output current measure and cooperating with said circuit means, for obtaining a predetermined current measure of the sum of the synchronous reactance voltage drop of the generator and the external reactance voltage drop of said electrical system, a push-pull magnetic amplifier having magnetic core means, load windings disposed in inductive relationship with the magnetic core means, the load windings being responsive to said predetermined voltage measure of the system voltage, alternating-current control windings disposed in inductive relationship with the magnetic core means and disposed in cooperative relationship with the load windings, the alternating-current control windings being responsive to said predetermined current measure, and direct-current control windings disposed in inductive relationship with the magnetic core means and in opposition to the respective alternating current control windings for resetting the flux level in the magnetic core means, the direct-current control windings being responsive to said predetermined voltage measure of the system voltage, and further circuit means for rendering the field winding of the generator responsive to the current flow through the load windings once the relative magnitudes of the current flow through the load windings reaches a predetermined value, to thereby provide a minimum excitation limit for the generator.

2. In a regulating system for a generator having a field winding and disposed to supply energy to an electrical system, the combination comprising, a sensing circuit comprising, circuit means, responsive to a measure of the terminal voltage of the generator and to a measure of the output current of the generator, for obtaining a predetermined voltage measure of the system voltage, said terminal voltage measure and said output current measure having a predetermined phase relationship for a given operating condition, and other circuit means, responsive to the said output current measure and cooperating with said circuit means, for obtaining a predetermined current measure of the sum of the synchronous reactance voltage drop of the generator and the external reactance voltage drop of said electrical system, a push-pull magnetic amplifier having magnetic core means, load windings disposed in inductive relationship with the magnetic core means, the load windings being responsive to said predetermined voltage measure of the system voltage, alternating-current control windings disposed in inductive relationship with the magnetic core means and disposed in cooperative relationship with the load windings, the alternating-current control windings being responsive to said predetermined current measure, and direct-current control windings disposed in inductive relationship with the magnetic core means and in opposition to the respective alternating current control windings for resetting the flux level in the magnetic core means, the direct-current control windings being responsive to said predetermined voltage measure of the system voltage, another magnetic amplifier having control windings responsive to the output voltage of the generator, said another magnetic amplifier being connected to control the magnitude of the current flow through the filed winding of the generator in accordance with the magnitude of the output voltage of the generator, an impedance member connected to the load windings of the push-pull magnetic amplifier so that the magnitude of the voltage across a predetermined portion of the impedance member varies in accordance with the relative magnitudes of the current flow through the load windings of the push-pull magnetic amplifier, and a shunting circuit interconnected with the impedance member and with the control windings of said another magnetic amplifier, the shunting circuit functioning to shunt a portion of the current, flowing through the control windings of said another magnetic amplifier, through the impedance member once the magnitude of the voltage across the predetermined portion of the impedance member reaches a predetermined value, to thereby prevent the field excitation for the generator from decreasing below a predetermined value.

3. In a regulating system for a generator having a field winding and disposed to supply energy to an electrical system, the combination comprising, a sensing circuit comprising, circuit means, responsive to a measure of the terminal voltage of the generator and to a measure of the output current of the generator, for obtaining a predetermined voltage measure of the system voltage, said terminal voltage measure and said output current measure having a predetermined phase relationship for a given operating condition, and other circuit means, responsive to the said output current measure and cooperating with said circuit means, for obtaining a predetermined current measure of the sum of the synchronous reactance voltage drop of the generator and the external reactance voltage drop of said electrical system, a push-pull magnetic amplifier having magnetic core means, load windings disposed in inductive relationship with the magnetic core means, the load windings being responsive to said predetermined voltage measure of the system voltage, alternating-current control windings disposed in inductive relationship with the magnetic core means and disposed in cooperative relationship with the load windings, the alternating-current control windings being responsive to said predetermined current measure, and direct-current control windings disposed in inductive relationship with the magnetic core means and in opposition to the respective alternating-current control windings for resetting the flux level in the magnetic core means, the direct-current control windings being responsive to said predetermined voltage measure of the system voltage, another magnetic amplifier having control windings responsive to the output voltage of the generator, said another magnetic amplifier being connected to control the magnitude of the current flow through the field winding of the generator in accordance with the magnitude of the output voltage of the generator, an impedance member connected to the load windings of the push-pull magnetic amplifier so that the magnitude of the voltage across a predetermined portion of the impedance member varies in accordance with the relative magnitudes of the current flow through the load windings of the push-pull magnetic amplifier, and a shunting circuit, including a rectifier, interconnected with the impedance member and with the control windings of said another magnetic amplifier, the shunting circuit functioning to shunt a portion of the current, flowing through the control windings of said another magnetic amplifier, through the impedance member once the magnitude of the voltage across the predetermined portion of the impedance member reaches a predetermined value, to thereby prevent the field excitation for the generator from decreasing below a predetermined value.

4. In a regulating system for a generator having a field winding and disposed to supply energy to an electrical system, the combination comprising, a sensing circuit comprising, circuit means, responsive to a measure of the terminal voltage of the generator and to a measure of the output current of the generator, for obtaining a predetermined voltage measure of the system voltage, said terminal voltage measure and said output current measure having a predetermined phase relationship for a given operating condition, and other circuit means, responsive to the said output current measure and cooperating with said circuit means, for obtaining a predetermined current measure of the sum of the synchronous reactance voltage drop of the generator and the external reactance voltage drop of said electrical system, a push-pull magnetic amplifier having magnetic core means, load windings disposed in inductive relationship with the magnetic core means, the load windings being responsive to said predetermined voltage measure of the system voltage, alternating-current control windings disposed in inductive relationship with the magnetic core means and disposed in cooperative relationship with the load windings, the alternating-current control windings being responsive to said predetermined current measure, and direct-current control windings disposed in inductive relationship with the magnetic core means and in opposition to the respective alternating current control windings for resetting the flux level in the magnetic core means, the direct-current control windings being responsive to said predetermined voltage measure of the system voltage, another magnetic amplifier having control windings responsive to the output voltage of the generator, said another magnetic amplifier being connected to control the magnitude of the current flow through the field winding of the generator in accordance with the magnitude of the output voltage of the generator, an impedance member connected to the load windings of the push-pull magnetic amplifier so that the magnitude of the voltage across a predetermined portion of said impedance member varies in accordance with the relative magnitudes of the current flow through the load windings of the push-pull magnetic amplifier, a rectifier for connecting the predetermined portion of the impedance member in parallel circuit relationship with the control windings of said another magnetic amplifier, so that a portion of the current flowing through the control windings of said another amplifier is shunted through said predetermined portion of the impedance member once the magnitude of the voltage across the predetermined portion of the impedance member reaches a predetermined value, to thus prevent the excitation of the generator from decreasing below a predetermined value.

5. In a regulating system for a three-phase generator having a field winding and disposed to supply energy to three line conductors of an electrical system, the combination comprising, a potential transformer having a primary winding and a secondary winding, the primary winding being responsive to the voltage between two of the three line conductors, an impedance member connected in series circuit relationship with the secondary winding, a current transformer having a primary winding and a secondary winding, circuit means for circulating through the primary winding of the current transformer and through the impedance member a measure of the current flow through the other of the three line conductors, whereby the output current from the secondary winding of the current transformer is proportional to the sum of the synchronous reactance voltage drop of the three-phase generator and the external reactance voltage drop of said electrical system, and whereby a voltage proportional to the system voltage appears across the series circuit including the impedance member and the secondary winding of the potential transformer, a push-pull magnetic amplifier having magnetic core means, load windings disposed in inductive relationship with the magnetic core means, the load windings being connected to be responsive to the voltage that is proportional to the system voltage, alternating-current control windings disposed in inductive relationship with the magnetic core means and connected to the secondary winding of the current transformer, and direct-current control windings disposed in inductive relationship with the magnetic core means and in opposition to the respective alternating-current control windings for resetting the flux level in the magnetic core means, the direct-current control windings being responsive to said voltage that is proportional to the system voltage, and further circuit means for rendering the field winding of the three-phase generator responsive to the current flow through the load windings once the relative magnitudes of the current flow through the load windings reaches a predetermined value, to thereby provide a minimum excitation limit for the three-phase generator.

6. In a regulating system for a three-phase generator having a field winding and disposed to supply energy to three line conductors of an electrical system, the combination comprising, a potential transformer having a primary winding and a secondary winding, the primary winding being responsive to the voltage between two of the three line conductors, a variable impedance member connected in series circuit relationship with the secondary winding, a main current transformer associated with the other of the three line conductors so as to be responsive to the current flow therethrough, an auxiliary current transformer having a primary winding and a tapped secondary winding, the primary winding of the auxiliary current transformer being connected in series circuit relationship with the variable impedance member, the latter series circuit being connected to the main current transformer, whereby the output current from the secondary winding of the auxiliary current transformer is proportional to the sum of the synchronous reactance voltage drop of the three-phase generator and the external reactance voltage drop of said electrical system, and whereby a voltage proportional to the system voltage appears across the series circuit including the variable impedance member and the secondary winding of the potential transformer, a push-pull magnetic amplifier having magnetic core means, load windings disposed in inductive relationship with the magnetic core means, the load windings being connected to be responsive to the voltage that is proportional to the system voltage, alternating-current control windings disposed in inductive relationship with the magnetic core means and connected to the secondary winding of the auxiliary current transformer, and direct-current control windings disposed in inductive relationship with the magnetic core means and in opposition to the respective alternating-current control windings for resetting the flux level in the magnetic core means, the direct-current control windings being responsive to said voltage that is proportional to the system voltage, and further circuit means for rendering the field winding of the three-phase generator responsive to the current flow through the load windings once the relative magnitudes of the current flow through the load windings reaches a predetermined value, to thereby provide a minimum excitation limit for the three-phase generator.

7. In a regulating system for a generator having a field winding and disposed to supply energy to an electrical system, the combination comprising, a sensing circuit comprising, circuit means, responsive to a measure of the terminal voltage of the generator and to a measure of the output current of the generator, for obtaining a predetermined voltage measure of the system voltage, said terminal voltage measure and said output current measure having a predetermined phase relationship for a given operating condition, and other circuit means, responsive to the said output current measure and cooperating with said circuit means, for obtaining a predetermined current measure of the sum of the synchronous reactance voltage drop of the generator and the external reactance voltage drop of said electrical system, electrical means having an input and an output, the input of said electrical means being connected to be responsive to said predetermined voltage measure of the system voltage and to said predetermined current measure, the said electrical means being such as to produce at its output a signal proportional to the difference between the said predetermined voltage measure of the system voltage and the said predetermined current measure times the cosine of the angle between the said predetermined voltage measure and the said predetermined current measure, and further circuit means connected between the field winding of the generator and the output of said electrical means for rendering said field winding responsive to the output of said electrical means, to thereby obtain a minimum excitation limit for the generator.

8. In a regulating system for a three-phase generator having a field winding and disposed to supply energy to three line conductors of an electrical system, the combination comprising, a potential transformer having a primary winding and a secondary winding, the primary winding being responsive to the voltage between two of the three line conductors, an impedance member connected in series circuit relationship with the secondary winding, a current transformer having a primary winding and a secondary winding, circuit means for circulating through the primary winding of the current transformer and through the impedance member a measure of the current flow through the other of the three line conductors, whereby the output current from the secondary winding of the current transformer is proportional to the sum of the synchronous reactance voltage drop of the three-phase generator and the external reactance voltage drop of said electrical system, and whereby a voltage proportional to the system voltage appears across the series circuit including the impedance member and the secondary winding of the potential transformer, a push-pull magnetic amplifier having magnetic core means, load windings disposed in inductive relationship with the magnetic core means, the load windings being connected to be responsive to the voltage that is proportional to the system voltage, alternating-current control windings disposed in inductive relationship with the magnetic core means and connected to the secondary winding of the current transformer, and direct-current control windings disposed in inductive relationship with the magnetic core means and in opposition to the respective alternating-current control windings for resetting the flux level in the magnetic core means, the direct-current control windings being responsive to said voltage that is proportional to the system voltage, another magnetic amplifier having control windings responsive to the output voltage of the three-phase generator, said another magnetic amplifier being connected to control the magnitude of the current flow through the field winding of the three-phase generator in accordance with the magnitude of the output voltage of the three-phase generator, another impedance member connected to the load windings of the push-pull magnetic amplifier so that the magnitude of the voltage across a predetermined portion of said another impedance member varies in accordance with the relative magnitudes of the current flow through the load windings of the push-pull magnetic amplifier, and a shunting circuit interconnected with said another impedance member and with the control windings of the said another magnetic amplifier, the shunting circuit functioning to shunt a portion of the current, flowing through the control windings of the said another magnetic amplifier, through the said another impedance member once the magnitude of the voltage across the predetermined portion of the said another impedance member reaches a predetermined value, to thereby prevent the field excitation for the three-phase generator from decreasing below a predetermined value.

9. In a regulating system for a three-phase generator having a field winding and disposed to supply energy to three line conductors of an electrical system, the combination comprising, a potential transformer having a primary winding and a secondary winding, the primary winding being responsive to the voltage between two of the three line conductors, an impedance member connected in series circuit relationship with the secondary winding, a current transformer having a primary winding and a secondary winding, circuit means for circulating through the primary winding of the current transformer and through the impedance member a measure of the current flow through the other of the three line conductors, whereby the output current from the secondary winding of the current transformer is proportional to the sum of the synchronous reactance voltage drop of the three-phase generator and the external reactance voltage drop of said electrical system, and whereby a voltage proportional to the system voltage appears across the series circuit including the impedance member and the secondary winding of the potential transformer, a push-pull magnetic amplifier having magnetic core means, load windings disposed in inductive relationship with the magnetic core means, the load windings being connected to be responsive to the voltage that is proportional to the system voltage, alternating-current control windings disposed in inductive relationship with the magnetic core means and connected to the secondary winding of the current transformer, and direct-current control windings disposed in inductive relationship with the magnetic core means and in opposition to the respective alternating-current control windings for resetting the flux level in the magnetic core means, the direct-current control windings being responsive to said voltage that is proportional to the system voltage, another magnetic amplifier having control windings responsive to the output voltage of the three-phase generator, said another magnetic amplifier being connected to control the magnitude of the current flow through the field winding of the three-phase generator in accordance with the magnitude of the output voltage of the three-phase generator, another impedance member connected to the load windings of the push-pull magnetic amplifier so that the magnitude of the voltage across a predetermined portion of said another impedance member varies in accordance with the relative magnitudes of the current flow through the load windings of the push-pull magnetic amplifier, a rectifier for connecting the predetermined portion of the said another impedance member in parallel circuit relationship with the control windings of the said another magnetic amplifier, so that a portion of the current, flowing through the control windings of the said another magnetic amplifier, is shunted through said predetermined portion of the said another impedance member once the magnitude of the voltage across the said predetermined portion of the said another impedance member reaches a predetermined value, to thus prevent the excitation of the three-phase generator from decreasing below a predetermined value.

10. In a regulating system for a three-phase generator having a field winding and disposed to supply energy to three line conductors of an electrical system, the combination comprising, a potential transformer having a primary winding and a secondary winding, the primary winding being responsive to the voltage between two of the three line conductors, a variable impedance member connected in series circuit relationship with the secondary winding, a main current transformer associated with the other of the three line conductors so as to be responsive to the current flow therethrough, an auxiliary current transformer having a primary winding and a tapped secondary winding, the primary winding of the auxiliary current transformer being connected in series circuit relationship with the variable impedance member, the latter series circuit being connected to the main current transformer, whereby the output current from the tapped secondary winding of the auxiliary current transformer is poportional to the sum of the synchronous reactance voltage drop of the three-phase generator and the external reactance voltage drop of said electrical system, and whereby a voltage proportional to the system voltage appears across the series circuit including the variable impedance member and the secondary winding of the potential transformer, a push-pull magnetic amplifier having magnetic core means, load windings disposed in inductive relationship with the magnetic core means, the load windings being connected to be responsive to the system voltage that is proportional to the system voltage, alternating-current control windings disposed in inductive relationship with the magnetic core means and connected to the tapped secondary winding of the auxiliary current transformer, and direct-current control windings disposed in inductive relationship with the magnetic core means and in opposition to the respective alternating-current control windings for resetting the flux level in the magnetic core means, the direct-current control windings being responsive to said voltage that is proportional to the system voltage, another magnetic amplifier having control windings responsive to the output voltage of said generator, said another magnetic amplifier being connected to control the magnitude of the current flow through the field winding of the three-phase generator in accordance with the magnitude of the output voltage of the three-phase generator, another impedance member connected to the load windings of the push-pull magnetic amplifier so that the magnitude of the voltage across a predetermined portion of said another impedance member varies in accordance with the relative magnitudes of the current flow through the load windings of the push-pull magnetic amplifier, and a shunting circuit interconnected with said another impedance member and with the control windings of the said another magnetic amplifier, the shunting circuit functioning to shunt a portion of the current, flowing through the control windings of the said another magnetic amplifier, through the said another impedance member once the magnitude of the voltage across the predetermined portion of the said another impedance member reaches a predetermined value, to thereby prevent the field excitation for the three-phase generator from decreasing below a predetermined value.

11. In a regulating system for a three-phase generator having a field winding and disposed to supply energy to three line conductors of an electrical system, the combination comprising, a potential transformer having a primary winding and a secondary winding, the primary winding being responsive to the voltage between two of the three line conductors, a variable impedance member connected in series circuit relationship with the secondary winding, a main current transformer associated with the other of the three line conductors so as to be responsive to the current flow therethrough, an auxiliary current tansformer having a primary winding and a tapped secondary winding, the primary winding of the auxiliary current transformer being connected in series circuit relationship with the variable impedance member, the latter series circuit being connected to the main current transformer, whereby the output current from the tapped secondary winding of the auxiliary current transformer is proportional to the sum of the synchronous reactance voltage drop of the three-phase generator and the external reactance voltage drop of said electrical system, and whereby a voltage proportional to the system voltage appears across the series circuit including the variable impedance member and the secondary winding of the potential transformer, a push-pull magnetic amplifier having magnetic core means, load windings disposed in inductive relationship with the magnetic core means, the load windings being connected to be responsive to the voltage that is proportional to the system voltage, alternating-current control windings disposed in inductive relationship with the magnetic core means and connected to the tapped secondary winding of the auxiliary current transformer, and direct-current control windings disposed in inductive relationship with the magnetic core means and in opposition to the respective alternating-current control windings for resetting the flux level in the magnetic core means, the direct-current control windings being responsive to said voltage that is proportional to the system voltage, another magnetic amplifier having control windings responsive to the output voltage of the three-phase generator, said another magnetic amplifier being connected to control the magnitude of the current flow through the field winding of the three-phase generator in accordance with the magnitude of the output voltage of the three-phase generator, another impedance member connected to the load windings of the push-pull magnetic amplifier so that the magnitude of the voltage across a predetermined portion of said another impedance member varies in accordance with the relative magnitudes of the current flow through the load windings of the push-pull magnetic amplifier, a rectifier for connecting the predetermined portion of the said another impedance member in parallel circuit relationship with the control windings of the said another magnetic amplifier, so that a portion of the current, flowing through the control windings of the said another magnetic amplifier, is shunted through said predetermined portion of the said another impedance member once the magnitude of the voltage across the said predetermined portion of the said another impedance member reaches a predetermined value, to thus prevent the excitation of the three-phase generator from decreasing below a predetermined value.

References Cited in the file of this patent
UNITED STATES PATENTS
2,602,154    Sikorra                July 1, 1952